United States Patent

Longinotti

[15] 3,641,919
[45] Feb. 15, 1972

[54] APPARATUS FOR THE CONTINUOUS PROCESS COOKING OF HOMOGENIZED DIETETIC PRODUCTS

[72] Inventor: Franco Longinotti, San Casciano, Italy
[73] Assignee: I.B.P. Industrie Buitoni Perugina S.p.A., Perugia, Italy
[22] Filed: Jan. 27, 1970
[21] Appl. No.: 6,212

[30] Foreign Application Priority Data

Feb. 4, 1969 Italy..................................34705A/69

[52] U.S. Cl............................................................99/330
[51] Int. Cl.....................................................A47j 27/00
[58] Field of Search..............................99/330, 326–327, 99/328–329, 331–332, 348; 259/8, 23–24, 43–44, 107–108

[56] References Cited

UNITED STATES PATENTS

| | | |
|---|---|---|
| 964,935 | 7/1910 | Poulin et al..........................259/44 X |
| 2,639,861 | 5/1953 | Skinner............................99/330 UX |
| 2,778,922 | 1/1957 | Birkner............................259/43 UX |
| 3,216,042 | 11/1965 | Strittmatter.......................259/107 X |
| 3,332,338 | 7/1967 | Wein......................................99/330 |
| 3,348,470 | 10/1967 | Swanson..............................99/331 |
| 3,349,692 | 10/1967 | Jones....................................99/331 |

FOREIGN PATENTS OR APPLICATIONS 835,881 4/1952 Germany..............................259/107

Primary Examiner—Edward L. Roberts
Assistant Examiner—Arthur O. Henderson
Attorney—Browdy and Neimark

[57] ABSTRACT

The mass of dietetic product is passed in a constant flow through a narrow gap defined by walls kept at cooking temperature, while owing to the narrowness of the gap and to the action of stirring and scraping means provided in said gap the heat is uniformly transmitted from the walls throughout the breadth and depth of the food mass. A temperature-controlled hot water system ensures the desired constant temperature to the walls.

7 Claims, 6 Drawing Figures

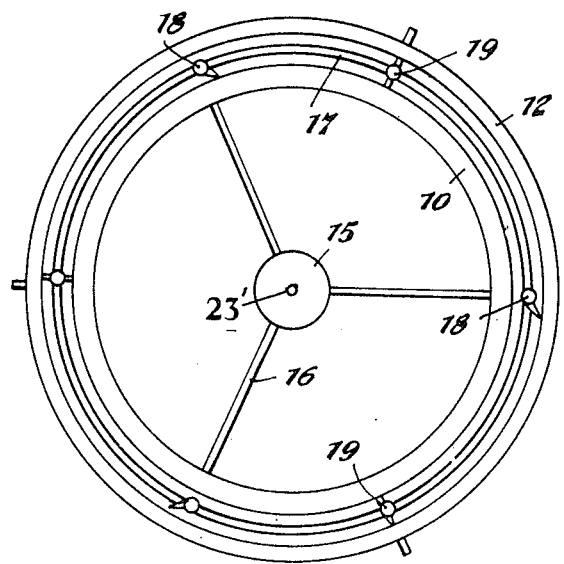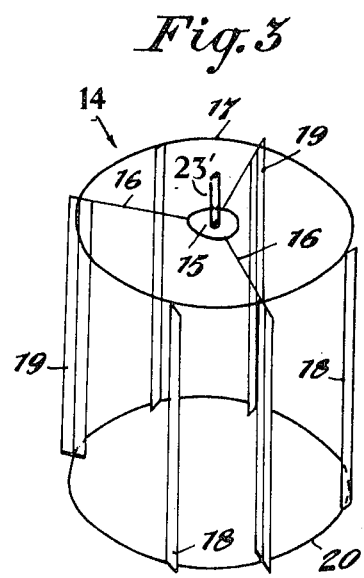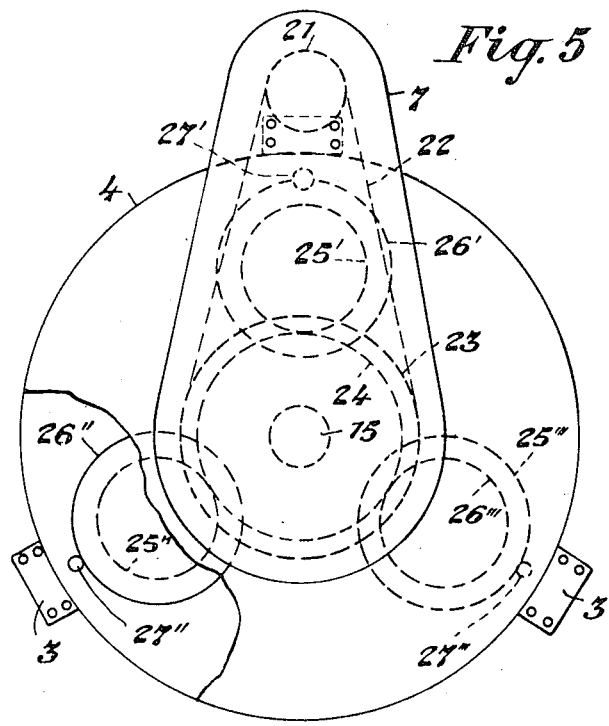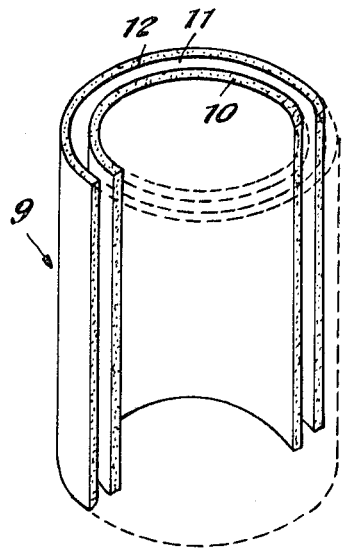

APPARATUS FOR THE CONTINUOUS PROCESS COOKING OF HOMOGENIZED DIETETIC PRODUCTS

The present invention refers to the continuous production of homogenized dietetic foods, particularly of meat and vegetables.

It is known that in the processing of homogenized products which fundamentally consist of a pulp of finely minced meats or vegetable substances, the whole pulp must be cooked in an accurately homogeneous manner, by observing with extreme precision the prescribed temperature and the duration of the cooking.

This cooking, although being very carefully regulated, was hitherto carried out with a discontinuous process within a machinery equipped with stirrers. The problem of cooking according to a continuous process has so far not been solved, especially owing to the difficulty of obtaining in such a process the homogeneous cooking of the whole product.

According to the present invention these difficulties are overcome by passing the product in a continuous flow through a narrow zone, which is delimited by two heated walls, the breadth of the zone being such that the heat transmitted from the walls will uniformly permeate the flow of product, so that the latter is uniformly cooked. This uniformity is additionally enhanced by inserting in the gap means which stir the product, and means which constantly scrape the walls to prevent the product from sticking to them.

The device embodying this procedure consists of a cooking unit comprising two heatable walls defining between them a cylindrical gap. The pulp of homogenized product flows through this gap and is heated by the walls.

The breadth of the cooking zone within which the product flows is a critical factor, since it must be selected so as to permit the passage of the necessary amount of heat from the walls towards the interior of the cooking zone, taking into account the flow rate of the product through said zone and the duration of its passage through it.

An embodiment of the invention will now be described with reference to the attached drawings, wherein:

FIG. 2 is a section taken along line II—II of FIG. 1.

FIG. 3 shows schematically the cage containing the stirrers and scrapers of the device.

FIG. 4 shows schematically the cooking unit.

FIG. 5 shows schematically the epicyclical gears actuating the cage of FIG. 3.

Figure 1:
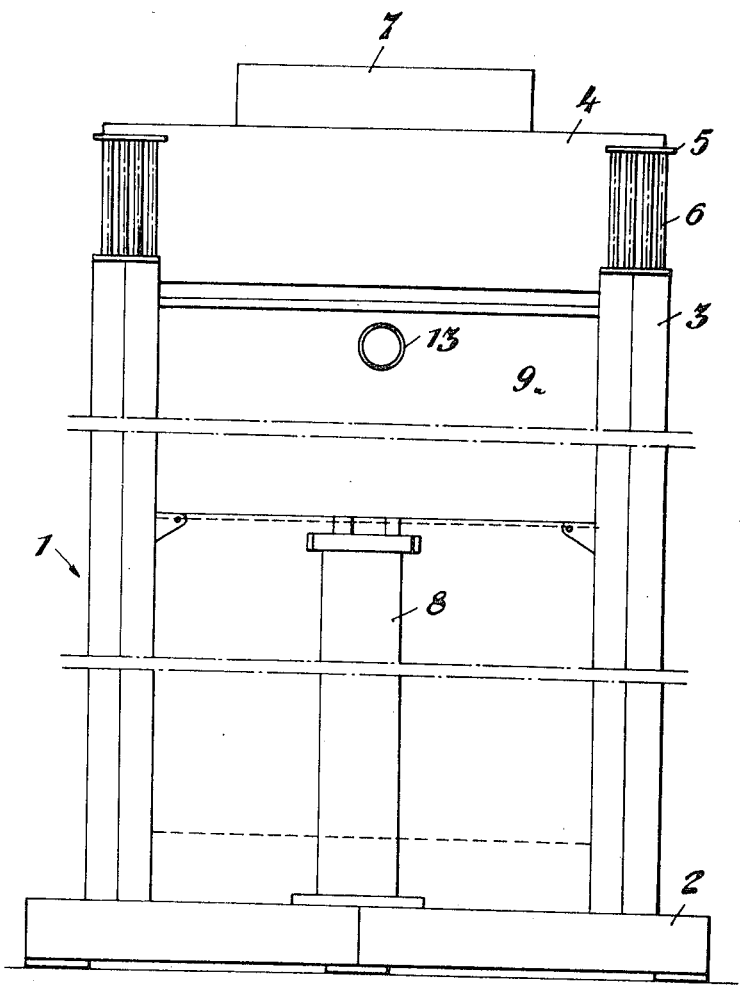
FIG. 1 is a lateral view of the embodiment.

In FIG. 1, the device is generally indicated at 1. It comprises essentially a base 2 and standards 3, along which the cooking unit 9 is vertically slidable.

Atop the standards 3 is mounted a gear box 4 containing the gears controlling the movement of the cage 14 which will be described later. This gear box 4 is fastened to the top of the standards 3 by means of flanges 5 and bolts 6. Atop said gear box is placed a transmission casing 7 containing the transmission from the motor to the gears. The gear box 4, which is preferably made of stainless steel, serves as a cover for the cooking unit 9 when the latter is in its lifted, operating position.

The cooling unit is mounted upon a hydraulic or pneumatic column jack 8 by means of which it can be lifted to its operating position (indicated by full lines in FIG. 1) or sunk to its lowermost position (indicated by dotted lines), in which the cage 14 is left free and readily accessible for maintenance and cleaning.

The cooking unit 9 is better illustrated in FIGS. 2 and 4. It comprises an interior cylindrical jacket 10, and an external also cylindrical jacket 12, coaxial with it, and defining between them a narrow annular cooking zone 11. Within said hollow jackets 10 and 12 there circulates heating water, at a preestablished cooking temperature and the homogenized product passes through said cooling zone in a continuous flow and is cooked during its passage through it. Preferably the product is introduced from below and issues from the top, in counterflow to the heating water which is introduced from the top and issues from the bottom of jackets 10 and 12. The outflow opening for the product is indicated at 13 in FIG. 1.

A material which has proved particularly suitable for the construction of the cooking unit is the AISI 304 stainless steel sheet in thicknesses of 3–4–6 mm.

A cylindrical cage, generally indicated at 14, is inserted into the cooking zone 11. This cage contains the stirrers and scrapers shown schematically in FIGS. 2 and 3. The cage comprises a disk 15 keyed or otherwise fastened to the gear shaft 23'; spider arms 16 connecting said disk with the upper cage ring 17 from which depends a plurality of scrapers 18 and stirrers 19, the whole being stiffened by a lower cage ring 20. Although not illustrated in FIG. 3, the stirrers 19 are rotatable within bearings provided in rings 17 and 20, while the scrapers 18 are spring biased against the internal surfaces of the jackets 10 and 12 delimiting the cooking zone 11. As previously stated, by lowering the cooking unit, the whole cage 14 becomes accessible for maintenance and cleaning. When the cooking unit is lifted to its upper position, the ring 20, together with the scrapers and stirrers, penetrates into the cooking surface 11, wherein it is rotated by an epicyclic gear mechanism contained in the gear box 4, whose schematized top view is shown in FIG. 5. The motor driven wheel 21 is coupled to a chain drive 22 or the like, to whose shaft 23' the cage 14 is fastened. A gear 24, coaxial with wheel 23, meshes with the gears 25', 25" and 25"' respectively, which are respectively coaxial and rigid with the gears 26', 26" and 26"', which mesh with pinions 27', 27", and 27"', each of which is coaxial and rigid with the stirrers 19. In this manner, the rotation of wheel 23 causes the rotation of the cage 14 within the cooking zone 11, while simultaneously the stirrers 19 are turned around their axes for a certain number of rotations per each revolution of wheel 23.

In a practical embodiment of the invention, the gears are driven by a screened type, 1,440 r.p.m., 4 HP electric motor, coupled to a worm-gear-type reduction unit having a reduction ratio of 40:1. Said group can be connected with the epicyclic gear mechanism by means of a Galle-type chain, in order to obtain 7 r.p.m. for the cage.

In the embodiment here illustrated there are three stirrers spaced 120° apart, with a Teflon scraper between each stirrer, one scraper pressing against the radially internal surface and two scrapers against the radially external surface of the cooking zone in order to assure their continuous cleaning.

The rotation of the cage 14 causes a continuous and extremely efficient mixing of the pulpy mass of homogenized product, which is uniformly cooked to the prescribed degree.

In a practical embodiment such cooking unit can produce from 1,500 to 2,000 kg./hr. of homogenized product, by entering at approximately 20° and issuing from the unit at approximately 65° C.

In a cooking unit of this type it is necessary to ensure a feed of constant temperature water in the jackets 10 and 12 and above all it is imperative that the temperature of this water should not rise above a preestablished limit, to eliminate any danger of spoiling the product.

Figure 6:
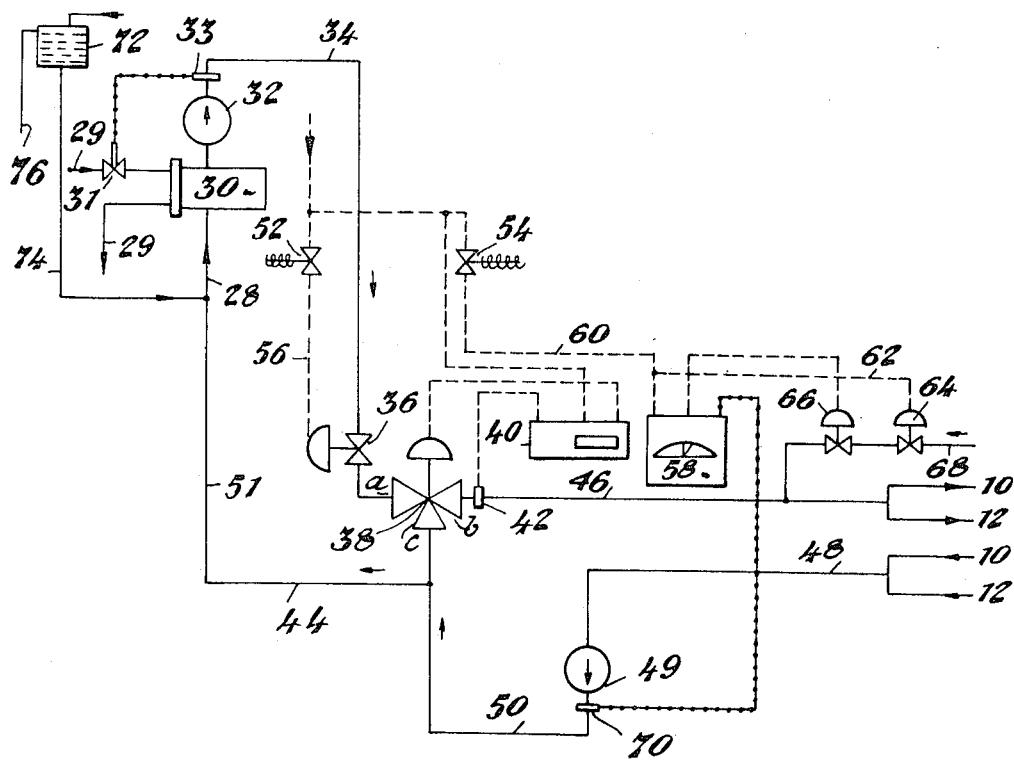
FIG. 6 is a diagram of the heating plant.

FIG. 6 shows the heating system for the cooking unit. The cold water from the feedline 28 is heated in the heat exchanger 30 to a desired temperature, for instance 85° C, and conveyed by a water circulating pump 32 to the jackets 10 and via lines 34 and 46. The steam flow in the steam line 29 of heat exchanger 30 is governed by a regulating valve 31 controlled by a heat responsive element 33. Through the hot waterline 34 the water is conveyed to a pneumatically controlled shutoff valve 36 which remains normally open during the operation of the plant.

A valve 38 having three ways $a$, $b$, $c$ positioned downstream of valve 36 in line 34 is governed by a temperature responsive and indicating control apparatus, whose sensor 42 is inserted in line 46 downstream of valve 38. Said apparatus 40 keeps the way $a$ of valve 38 open until the jacket heating water has reached the required cooking temperature (for instance 65° C.) whereafter it shuts said way $a$, thereby interrupting the inflow from line 34. The line 44, which branches from line 50 and leads, through a riser 51, back to line 28, has an internal diameter which is much narrower than the internal diameter of line 46 leading from valve 38 to jackets 10 and 12, of return line 48 from said jackets to a circulating pump 49 and of line 50 leading from the discharge of pump 49 back to way c of valve 38, and in addition to the smaller diameter the water in the riser 51 forms a water column of a 6 meter height. Thus, lines 44 and 51 offer a much higher resistance to flow than the system b–46–10–12–48–49–50–c and therefore this latter system forms practically a closed circuit, wherein the water is kept in forced circulation by the pump 49, when the opening a is closed. When the water temperature in this circuit sinks below a limit which can be preset on control 42, said control gradually opens the valve opening a and hot water from line 34 is introduced into the cycle to restore its temperature to the desired level.

To prevent the food in the cooking unit from becoming overcooked, when its flow through the cooking zone 11 stops for some reason and its stay therein is unduly prolonged, an emergency system is provided in the plant. An electric control, tripped for instance by the stoppage of the food chopper (not shown) feeding the product into the cooking zone, closes an electromagnetic valve 52 controlling the compressed air line 56. The consequent pressure drop in line 56 effects the shutting of valve 36 and thereby the interruption of the infeed of hot water to line 46. The stopping of the food chopper also causes the opening of valve 54 thereby permitting the passage of compressed air to the pneumatic control 58 through line 60. The compressed air opens, via line 62, the pneumatic valve 64 and, the pneumatic valve 66, valves 64 and 66 being inserted in the cold water line 68 connected to line 46. Therefore cold water is immitted into the closed circuit 46–10, 12–48–49–50–c–b–46 and rapidly circulated therein by pump 49, thereby quickly lowering the temperature of jackets 10 and 12, until it has reached a lower limit where, even after a prolonged exposure, it will not affect the food blocked in the cooking zone 11. A sensor 70 inserted in line 50 downstream of pump 49 signals that this lower temperature limit has been reached to the pneumatic control, which closes the valve 66 and thereby interrupts the inflow of additional cold water into the circuit.

Once the product resumes its flow in the cooking zone 11, for instance owing to the restarting of the food chopper, this is signalled to the control 58. Therefrom a signal is emitted to the electromagnetic valves 52 and 54, causing the opening of the former and the closure of the latter. Consequently also valve 64 is closed, while valve 36 is opened to immit again hot water into the circuit until jackets 10 and 12 resume the required temperature.

The volume of the water circulating in the system is kept constant by the compensation tank 72 which is connected by a line 74 to line 28 and provided with an overflow pipe 74 to discharge excess water.

I claim:
1. A device for the continuous cooking of homogenized dietetic food products, comprising
   a cooking unit including narrow passageway means in which said food is continuously conveyed and simultaneously cooked, said narrow passageway being formed by the narrow gap between two closely spaced heatable walls, the spacing between said heatable walls being predetermined to permit the passage of the necessary amount of heat from the walls to the center of said passageway;
   stirring means of width equal to the width of said narrow gap rotatable within said passageway;
   scraping means biased against the internal surfaces of said walls and movable there along;
   inlet and outlet means to said narrow passageway for the inflow and outflow of said food pulp; and
   means for heating said walls and means to regulate the temperature of said walls.

2. A device according to claim 1, wherein the cooking unit comprises:
   an external cylindrical jacket;
   an external cylindrical jacket coaxially disposed within it, the gap between said two jackets forming an annular cooking zone;
   a cylindrical cage rotatable within said zone, coaxial with said jackets, said cage including a pair of rings spaced axially a distance approximately equal to the axial length of said jackets;
   stirring means secured to said cage between said rings and penetrating into said cooking zone, said stirring means being of axial length equal to the axial length of said cooking zone, and being rotatable around their longitudinal axes with respect to said cage;
   scraping means of axial length equal to the axial length of said cooking zone and being rigid on said cage between said rings and biased against the jacket surfaces delimiting said cooking zone;
   means to circulate a heating fluid through the interior of said jackets and means to adjust the temperature of said fluid; and
   means to rotate said cage within said zone and to simultaneously rotate said stirring means about their longitudinal axes.

3. A device according to claim 1, additionally comprising:
   a gear mechanism fixedly connected to said cage and rotating said cage within said cooking zone and the stirring means around their longitudinal axes;
   a gear box enclosing said mechanism and forming a top cover for said cooking unit when it is in an upper, operating position;
   lifting means to move said cooking unit from said upper position to a lowermost position wherein it is disengaged from said gear box and cage for maintenance and inspection.

4. A device according to claim 3, wherein the gear mechanism comprises a central motor-driven gear whose shaft is rigid with said cage and peripheral gears meshing with said central gear and whose shaft is rigid with the stirring means.

5. A device according to claim 4, wherein the cage comprises three stirring means spaced 120° apart along the periphery of said cage and three scraping means spaced 120° apart and 60° with respect to adjacent stirring means.

6. A device according to claim 1, comprising:
   a hot waterline heated by a heating element;
   a heat responsive element controlling the temperature of said water;
   a closed water circuit comprising said jackets; said circuit being fed by said hot waterline;
   heat responsive means shutting off the hot water feed when the water in said circuit has reached a requested cooking temperature and restoring said feed once the circuit temperature has sunk under said cooking temperature, said heat responsive means comprising a three-way valve between said closed water circuit and said hot waterline, and a thermostat within said closed circuit controlling said three-way valve.

7. A device according to claim 6, additionally comprising:
   a cooling waterline connected to said circuit;
   valves in said line;
   means responsive to the food flow in the cooking zone opening one of said valves when said food flow stops to immit cooling water into said circuit and closing said valve when the temperature in said circuit has reached a preset lower limit.

* * * * *

UNITED STATES PATENT OFFICE
CERTIFICATE OF CORRECTION

Patent No. 3,641,919      Dated Feb. 15, 1972

Inventor(s) Franco LONGINOTTI

It is certified that error appears in the above-identified patent and that said Letters Patent are hereby corrected as shown below:

Column 4, line 7 (claim 2) delete "external" and insert --internal--

Signed and sealed this 18th day of July 1972.

(SEAL)
Attest:

EDWARD M. FLETCHER, JR.
Attesting Officer

ROBERT GOTTSCHALK
Commissioner of Patents